US011397923B1

(12) United States Patent
Garrity et al.

(10) Patent No.: US 11,397,923 B1
(45) Date of Patent: Jul. 26, 2022

(54) DYNAMICALLY ADAPTIVE ORGANIZATION MAPPING SYSTEM

(71) Applicant: Sprinklr, Inc., New York, NY (US)

(72) Inventors: Justin Trevor Garrity, Portland, OR (US); Dan Blaisdell, Hillsboro, OR (US)

(73) Assignee: SPRINKLR, INC., New York, NY (US)

(*) Notice: Subject to any disclaimer, the term of this patent is extended or adjusted under 35 U.S.C. 154(b) by 354 days.

(21) Appl. No.: 16/595,173

(22) Filed: Oct. 7, 2019

(51) Int. Cl.
G06Q 10/10 (2012.01)
G06Q 10/08 (2012.01)
G06Q 30/08 (2012.01)
G06Q 30/02 (2012.01)
G06F 16/9536 (2019.01)

(52) U.S. Cl.
CPC ....... *G06Q 10/105* (2013.01); *G06F 16/9536* (2019.01)

(58) Field of Classification Search
CPC .......................... G06Q 10/105; G06F 16/9536
USPC .......................................... 705/1.1–912, 320
See application file for complete search history.

(56) References Cited

U.S. PATENT DOCUMENTS

| 7,406,436 | B1 | 7/2008 | Reisman |
| 8,655,938 | B1 | 2/2014 | Smith |
| 8,972,275 | B2 | 3/2015 | Park et al. |
| 9,201,955 | B1 | 12/2015 | Quintao |
| 9,218,610 | B2 | 12/2015 | Kandregula |
| 9,734,514 | B2 | 8/2017 | Heffernan |
| 10,467,630 | B2 | 11/2019 | Iyer et al. |
| 10,535,029 | B2 | 1/2020 | Garrity |
| 10,684,738 | B1 | 6/2020 | Sicora |
| 10,769,223 | B1 | 9/2020 | Patel |
| 2001/0028369 | A1 | 10/2001 | Gallo |
| 2003/0187956 | A1 | 10/2003 | Belt |
| 2003/0220835 | A1 | 11/2003 | Barnes, Jr. |
| 2004/0054819 | A1 | 3/2004 | Daimoto et al. |
| 2005/0050021 | A1 | 3/2005 | Timmons |

(Continued)

FOREIGN PATENT DOCUMENTS

WO WO 2016/118425 A1 7/2016

OTHER PUBLICATIONS

Gruhl, et al., "Multimodal social intelligence in a real-time dashboard system", VLDB Journal 19.6: 825-848; Springer New York; Jan. 1, 2010.

(Continued)

*Primary Examiner* — Jonathan P Ouellette
(74) *Attorney, Agent, or Firm* — Schwabe Williamson & Wyatt

(57) ABSTRACT

An organization mapping system reverse engineer's online data from websites and social network accounts into an organization map representing brands owned by a company. The mapping system extracts objects from the online data associated with different brands, products, services, campaigns, locations, events, etc. The mapping system organizes the objects into an organization map that can be used to automatically configure enterprise software. The organization map necessarily includes the most recent and up-to-date brands, products, and campaigns operating within a company and is therefore inherently more accurate than current organization mapping techniques.

20 Claims, 10 Drawing Sheets

(56) References Cited

U.S. PATENT DOCUMENTS

| | | |
|---|---|---|
| 2005/0131909 A1 | 6/2005 | Cavagnaro et al. |
| 2006/0184963 A1 | 8/2006 | Snijder |
| 2007/0103583 A1 | 5/2007 | Burnett |
| 2008/0284910 A1 | 11/2008 | Erskine |
| 2010/0119053 A1 | 5/2010 | Goeldi |
| 2010/0153377 A1* | 6/2010 | Rajan ............... G06F 16/24575 707/723 |
| 2010/0185630 A1* | 7/2010 | Cheng ................. H04L 51/32 707/756 |
| 2011/0004827 A1 | 1/2011 | Doerr |
| 2011/0098108 A1 | 4/2011 | Kuper |
| 2011/0122155 A1 | 5/2011 | Zechlin |
| 2011/0255748 A1 | 10/2011 | Komoto |
| 2011/0307312 A1 | 12/2011 | Goeldi |
| 2011/0320948 A1 | 12/2011 | Choi |
| 2012/0110427 A1 | 5/2012 | Krause |
| 2012/0134536 A1 | 5/2012 | Myokan |
| 2012/0291059 A1 | 11/2012 | Roberts |
| 2013/0014137 A1 | 1/2013 | Bhatia |
| 2013/0124653 A1 | 5/2013 | Vick |
| 2013/0166379 A1 | 6/2013 | Ehindero |
| 2013/0297581 A1 | 11/2013 | Ghosh |
| 2013/0297694 A1 | 11/2013 | Ghosh |
| 2014/0040029 A1 | 2/2014 | Vhora |
| 2014/0143333 A1 | 5/2014 | Dodge |
| 2014/0156341 A1 | 6/2014 | Kruk |
| 2014/0172744 A1 | 6/2014 | El-Hmayssi |
| 2014/0180788 A1 | 6/2014 | George |
| 2014/0214819 A1 | 7/2014 | Aitchison |
| 2014/0222578 A1 | 8/2014 | Poornachandran |
| 2014/0232616 A1 | 8/2014 | Drake |
| 2014/0280052 A1 | 9/2014 | Alonzo et al. |
| 2014/0358630 A1 | 12/2014 | Bhagat |
| 2014/0361954 A1 | 12/2014 | Epstein |
| 2015/0012353 A1 | 1/2015 | Ciancio-Bunch |
| 2015/0019335 A1 | 1/2015 | Zhou |
| 2015/0031389 A1 | 1/2015 | Liu |
| 2015/0046269 A1 | 2/2015 | Liu |
| 2015/0046781 A1 | 2/2015 | Baker |
| 2015/0067075 A1 | 3/2015 | Sheppard et al. |
| 2015/0088622 A1 | 3/2015 | Ganschow |
| 2015/0089429 A1 | 3/2015 | Ghassabian |
| 2015/0100377 A1 | 4/2015 | Penumaka |
| 2015/0112814 A1 | 4/2015 | Stokes |
| 2015/0113018 A1 | 4/2015 | Steed et al. |
| 2015/0161633 A1 | 6/2015 | Adams |
| 2015/0163311 A1 | 6/2015 | Heath |
| 2015/0186929 A1 | 7/2015 | Thies |
| 2015/0187333 A1 | 7/2015 | Loeffler |
| 2015/0213119 A1 | 7/2015 | Agarwal |
| 2015/0235239 A1 | 8/2015 | Chowdhary |
| 2015/0279037 A1 | 10/2015 | Griffin |
| 2016/0019397 A1 | 1/2016 | Peterson |
| 2016/0088362 A1 | 3/2016 | Kaneko et al. |
| 2016/0092499 A1* | 3/2016 | Leigh ................. G06F 8/34 707/740 |
| 2016/0140627 A1 | 5/2016 | Moreau |
| 2016/0155389 A1 | 6/2016 | Beon |
| 2016/0188661 A1 | 6/2016 | Huang et al. |
| 2016/0217408 A1 | 7/2016 | Garrity |
| 2016/0225017 A1 | 8/2016 | Wong |
| 2016/0321696 A1 | 11/2016 | Murthy |
| 2016/0343040 A1 | 11/2016 | Garrity |
| 2017/0010756 A1* | 1/2017 | Liensberger ............ H04L 41/22 |
| 2017/0061469 A1 | 3/2017 | Garrity |
| 2017/0084246 A1 | 3/2017 | Joshi |
| 2017/0206557 A1 | 7/2017 | Abrol et al. |
| 2017/0357217 A1 | 12/2017 | Raymann et al. |
| 2017/0372429 A1 | 12/2017 | La Placa |
| 2018/0024712 A1 | 1/2018 | Sievers |
| 2018/0260185 A1 | 9/2018 | Garrity |
| 2019/0026786 A1 | 1/2019 | Khoury |
| 2019/0026788 A1 | 1/2019 | Garrity |
| 2019/0065610 A1 | 2/2019 | Singh |
| 2019/0087874 A1 | 3/2019 | DeLuca |
| 2019/0094027 A1 | 3/2019 | Xu |
| 2019/0102075 A1 | 4/2019 | Naidoo |
| 2019/0173826 A1 | 6/2019 | DeLuca |
| 2019/0205839 A1 | 7/2019 | Dotan-Cohen |
| 2019/0206231 A1 | 7/2019 | Armstrong |
| 2019/0230473 A1 | 7/2019 | Raji et al. |
| 2019/0265942 A1 | 8/2019 | Yoshimura |
| 2019/0333118 A1 | 10/2019 | Crimmons |
| 2020/0177722 A1 | 6/2020 | Janugani |
| 2020/0226526 A1 | 7/2020 | Garrity |
| 2020/0250395 A1 | 8/2020 | Ross |
| 2020/0273063 A1 | 8/2020 | Garrity et al. |
| 2020/0293258 A1 | 9/2020 | Lin |
| 2020/0387411 A1 | 12/2020 | Chu |
| 2020/0401640 A1 | 12/2020 | Garrity |
| 2021/0295233 A1 | 9/2021 | Garrity et al. |

OTHER PUBLICATIONS

Guille et al. "SONDY: An open source platform for social dynamics mining and analysis" Proceedings of the ACM SIGMOD International Conference on Management of Data: 1005-1008. Association for Computing Machinery. (Jul. 30, 2013).

Henderson, Harry: "Encyclopedia of Computer Science and Technology" Nov. 1, 2008, Facts on File; 580 pages.

International Search Report and Written Opinion from the International Searching Authority for PCT/US2016/013680 dated Mar. 22, 2016; 12 pages.

Psaltis, Andrew G.; "Streaming Data Designing the Real-Time Pipeline" Jan. 16, 2015, Manning Publications; 12 pages.

Tanenbaum, Andrew S., et al.; "Distributed Systems: Principles and Paradigms (2nd Edition)" Prentice Hall; Oct. 12, 2006; 68 pages.

Trendsmap Announces First Real-Time Geographic Visualization for Twitter Trends Tracking Business Wire Sep. 22, 2009: NA.

Wikipedia: "Server (computing)", Internet Article Jan. 19, 2015; retrieved from the internet: <URL: https://en.wikipedia.org/w/index.php?title=Server_(computing)&oldid=643171056> retrieved on Mar. 14, 2016; 7 pages.

Paek et al., "A Multimethod Approach to Evaluating Social Media Campaign Effectiveness", pp. 1570-1579 (2013).

McIntyre et al., Support for Multitaking and Background Awareness Using Interactive Peripheral Displays, ACM 2001, pp. 41-50 (2001).

Krishnaprasad et al., "JuxtaView—A Tool for Interactive Visualization of Large Imagery on Scalable Tiled Displays", IEEE 2004, pp. 411-420 (2004).

Yamaoka et al., Visualization of High-Resolution Image Collections on Large Tiled Display Wall, Elsevier 2011, pp. 498-505 (2011).

* cited by examiner

DYNAMICALLY ADAPTIVE ORGANIZATION MAPPING SYSTEM

BACKGROUND

Enterprise software may need to be configured for the organizational structure of a business. For example, enterprise software may need to map users to different groups organized by brands, regions, and functions within a business. The configured enterprise software allows employees working within the same groups to access and share information and other assets, such as advertisements for specific campaigns.

Organization of enterprise software is typically manually configured by a system administrator who creates folders for each group or entity operating within the company, links the folders for related groups together, and assigns users and associated permissions to the employees associated with the different groups. The system administrator has to repeat the same manual configuration for each purchased software platform.

The structures within a company are constantly changing. For example, companies constantly create new brands, products, and campaigns. Therefore, the system administrator needs to continuously add, delete, and rearrange software folders in the enterprise software for this never-ending combination of brands, products, and/or campaigns operating within the company. No one person may even know all of the different groups currently operating within the company. As a result, enterprise software is infrequently updated and often does not include all of the current groups within the company. Employees are then forced to store content is ad-hoc folders that are not known or effectively used by other employees.

DETAILED DESCRIPTION

Companies naturally present themselves through brands, regions, and campaigns on social media accounts and on their websites in order to more effectively communicate with customers. An organization mapping system searches and discovers the websites and social media accounts owned by a company and then reverse engineers the organizational structure of the company through the identified accounts and associated brands.

Websites often include links to associated social media accounts and social media profile pages often include links back to the corresponding websites. The mapping system uses these linked relationships to identify the online accounts operated by a same company. The mapping system then scans all of the identified accounts to derive an organization map that identifies the brands associated with the company and the relationships between the different brands. Companies out of necessity keep their public facing online accounts up to date. The organization map generated from the online data therefore necessarily includes the most recent and up-to-date brands, products, and campaigns operating within a company and is therefore inherently more accurate than current organization mapping techniques.

The organization map not only identifies brands, but also shows how various brands and variants of brands relate to one another including master brands (top level), sub-brands (under master brands), monolithic brands (name of company plus common name), endorsed brands (name of brand strongly associated with the master brand), pluralistic brands (brand not associated with master brand), and regional variant brands (brand is a location of the parent brand). The organization map shows these relationships and creates a model that can quickly and accurately populate a variety of different software structures.

Figure 1A:
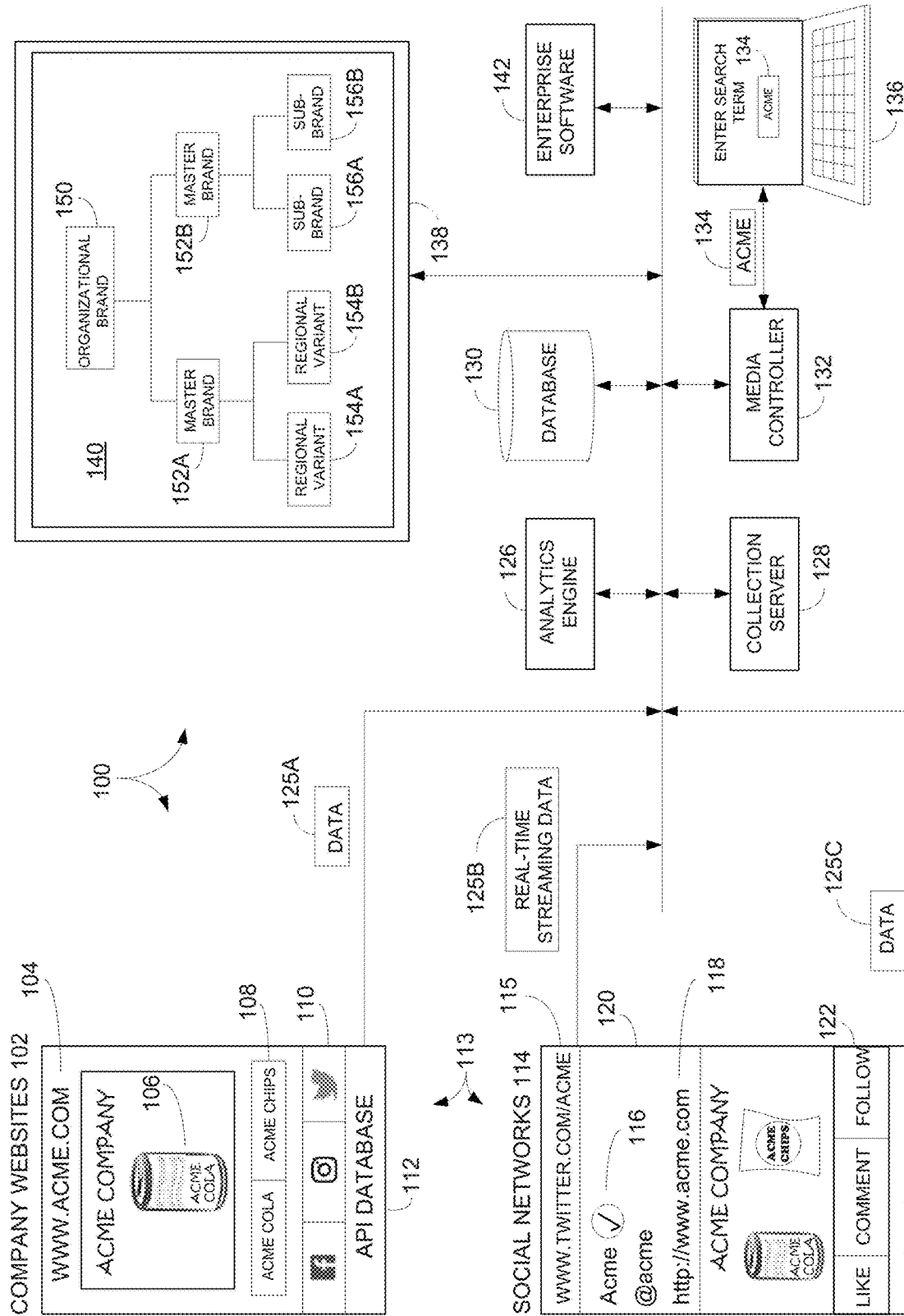
FIG. 1A shows an example organization mapping system that automatically identifies the organizational structure of a business.

FIG. 1A shows an organization mapping system 100 that accesses different online data sources 113, such as company websites 102, social networks 114, third party data, or any other source of online data or social media content. Websites 102 may be operated by companies, organizations, individuals, or any other entity. For example, websites 102 may include the www.acme.com website 104 and other websites operated by the Acme Company.

Social media networks 114 may include different social media channels, such as Twitter®, Facebook®, Instagram®, Youtube®, and the like. In one example, the Acme Company may operate one or more social media accounts 115 on one or more social media networks 114 such as www.twitter.com/acme, www.facebook.com/acme, www.instagram.com/acme, and www.youtube.com/acme.

Other third-party data sources 113 may include websites such as Adobe® or Google® analytics that monitor, measure, and/or generate analytics for social media, data sources, websites, etc. Another example third party data source 113 may include customized databases, such as created by Salesforce®, Microsoft®, or Adobe® that provide access to marketing and sales data.

Some data sources 113 may provide content, such as posted messages, and other data sources 113 may provide more numerical data such as, analytic data, company sales data, inventory data, financial data, spreadsheet data, website ecommerce data, wrist band radio frequency identification (RFID) reader data, number web page views, number of unique page views, time on web pages, starting web page, bounce rates, percentage of exists from web pages, impressions, Klout, or any other analytic data that may be relevant to a social media campaign.

An analytics engine 126 and a collection server 128 may use database application programmer interfaces (APIs) 112 to access online data 125 from online data sources 113. For example, analytics engine 126 may use APIs 112 to extract real-time streaming data 125B from any of data sources 113. Collection server 128 also may use APIs 112 to extract and store data 125 from data sources 113 in a database 130. Streaming data 125B may include real-time updates to data 125 already stored in database 130.

A user may enter a search term 134 into a computer 136. For example, the user may enter any keyword, data string, term, value, or any other combination of characters into computer 136. In one example, search term 134 may be the name of a company or person, a name of a product or service, a brand name, a name of a campaign or event associated with a company or person, a name of a department within a company, a name of an account on a social website, a name of a subject or account, a hashtag name associated with the person or company, a name of a competitor or competitive product, or the name of any other service, item, topic, data category, content, event, or any other entity identifier.

A media controller 132 may direct collection server 128 and/or analytics engine 126 to search, identify and extract data 125 from data sources 113 associated with search term 134. For example, media controller 132 may direct collection server 128 and/or analytics engine 126 to search for any websites 104 or social media accounts 115 that include the keyword Acme. Media controller 132 then directs collection server 128 and/or analytics engine 126 to scan any identified online accounts 104 and/or 115 for data 125 related to the organization structure of the Acme Company.

In this example, analytics engine 126 identifies www.acme.com website 104. Analytics engine 126 parses website 104 for any text, links, or any other metadata 125A that may identify brands associated with the Acme Company. Analytics engine 126 also may identify different social media accounts 115 that include the Acme keyword 134. In this example, analytics engine 126 identifies Twitter® social media account www.twitter.com/acme. Analytics engine 126 also parses social media account 115 for any text, links, or any other metadata 125C identifying brands owned by the Acme Company.

Analytics engine 126 may identify links 110 on website 104 to different social media accounts 115 associated with the Acme Company. Similarly, analytics engine 126 may identify profiles 120 in social media accounts 115 that include links 118 to associated company Acme websites 104.

It has been discovered that companies are often organized around their different brands and that these different brands also have associated websites 104 and/or social media accounts 115. Analytics engine 126 identifies the different brands associated with a company by identifying the websites 104 and social media accounts 115 operated by those brands. Analytics engine 126 then converts the identified brands into an organization (org) map 140.

Social media networks often verify known brands with a verification badges to help prevent fraudulent accounts being mistaken for real accounts. Analytics engine 126 identifies verification badge 116 to validated social media account 115 belongs to the Acme brand. Analytics engine 126 may discard identified social media accounts 115 that do not include verification badges 116 and are not related to the Acme Company.

Analytics engine 126 may identify and classify different brands 150, 152, 154, and 156 owned by the Acme Company based on data 125 obtained from Acme website 104 and Acme social media account 115. For example, analytics engine 126 may identify an overall organizational brand 150 owned by the Acme Company, and identify master brands 152A and 152B that operate under organizational brand 150. Analytics engine 126 may identify multiple regional variant brands 154A and 154B that operate under master brand 152A and identify different sub-brands 156A and 156B that operate under master brand 152B.

Organizational brand 150 may associated with the company that owns or controls all of the other brands 152, 154, and 156. For example, the Acme Company may be associated with organizational brand 150 and own an Acme Cola master brand 152A and an Acme Chip master brand 152B. Regional variant brands 154A and 154B may be the same brand as master brand 152A but operate in different geographical regions, such as Acme Cola Mexico 154A and Acme Cola Japan, respectively. Sub-brands 156A and 154B may be any other brands that operate underneath master brand 154B, such as a specific organic chip brand, tortilla chip brand, and a popcorn brand.

Analytics engine 126 generates organizational map 140 based on the identified Acme websites 104, Acme social media accounts 115, and the links, sub-directories, text, and/or metadata in the identified websites 104 and social media accounts 115. For example, Acme organizational brand 105 may be associated with the www.acmecola.com website and the www.twitter.com/acme social media account. Master brand 152A may be associated with the www.acmecola.com website and the www.twitter.com/acmecola social media account.

Analytics engine 126 may identify the relationship between master brand 152A and associated regional variant brands 154A and 154A based on the content and structure of websites 104 and social media accounts 115. For example, an Acme regional variant brand 154 may use a similar URL as a related master brand 152A, but with a different top-level country domain. For example, Acme Cola master brand 152A may operate website www.acme_cola.com. Regional Mexico variant brand 154A may operate website www.acme_cola.mx and regional Japan variant brand 154B may operate website www.acme_cola.jp. Master brand 152A also may have twitter account www.twitter/acmecola and regional variant brands 154A and 154B may have related twitter accounts www.twitter/acmecola mx and www.twitter/acmecola_jp, respectively.

Accordingly, analytics engine 126 may determine Acme Cola Mexico and Acme Cola Japan are regional variant brands 154A and 154B, respectively, of Acme Cola master brand 152A. Analytics engine 126 again may use verification badges 116 in profiles 120 of social media accounts www.twitter/acmecola mx and www.twitter/acmecola_jp to verify affiliation with Acme Cola master brand 152A and/or Acme organizational brand 150.

Analytics engine 126 may identify sub-brands 156A and 156B of master brand 152B based on other data, links, sub-directories, metadata in identified websites 104 and social media accounts 115. For example, website www.acmechips.com for master brand 152B may identify other products. Analytics engine 126 also may identify separate websites 104 and/or social media accounts 115 for the identified products and classify the products as sub-brands 156A and 156B.

For example, website 104 for Acme Chips master brand 152B may include metadata, directories, and/or links to different snack foods such as specific brands of potato chips, organic chips, popcorn, and nuts. Analytics engine 126 may classify each of the products mentioned on the www.acmechips.com website as a sub-brand 156 operating underneath master brand 152B.

Analytics engine 126 may identify certain brands 150, 152, 154, and 156 associated with the Acme Company, but may not have enough information to determine how the brands are hierarchically related. Analytics engine 126 may display a portion of org chart 140 with predicted hierarchal brand relationships. Analytics engine 126 may display other identified brands as disconnected objects in org chart 140. The system operator can then drag and drop the non-connected Acme brands to their proper hierarchal locations within org chart 140.

Figure 1B:
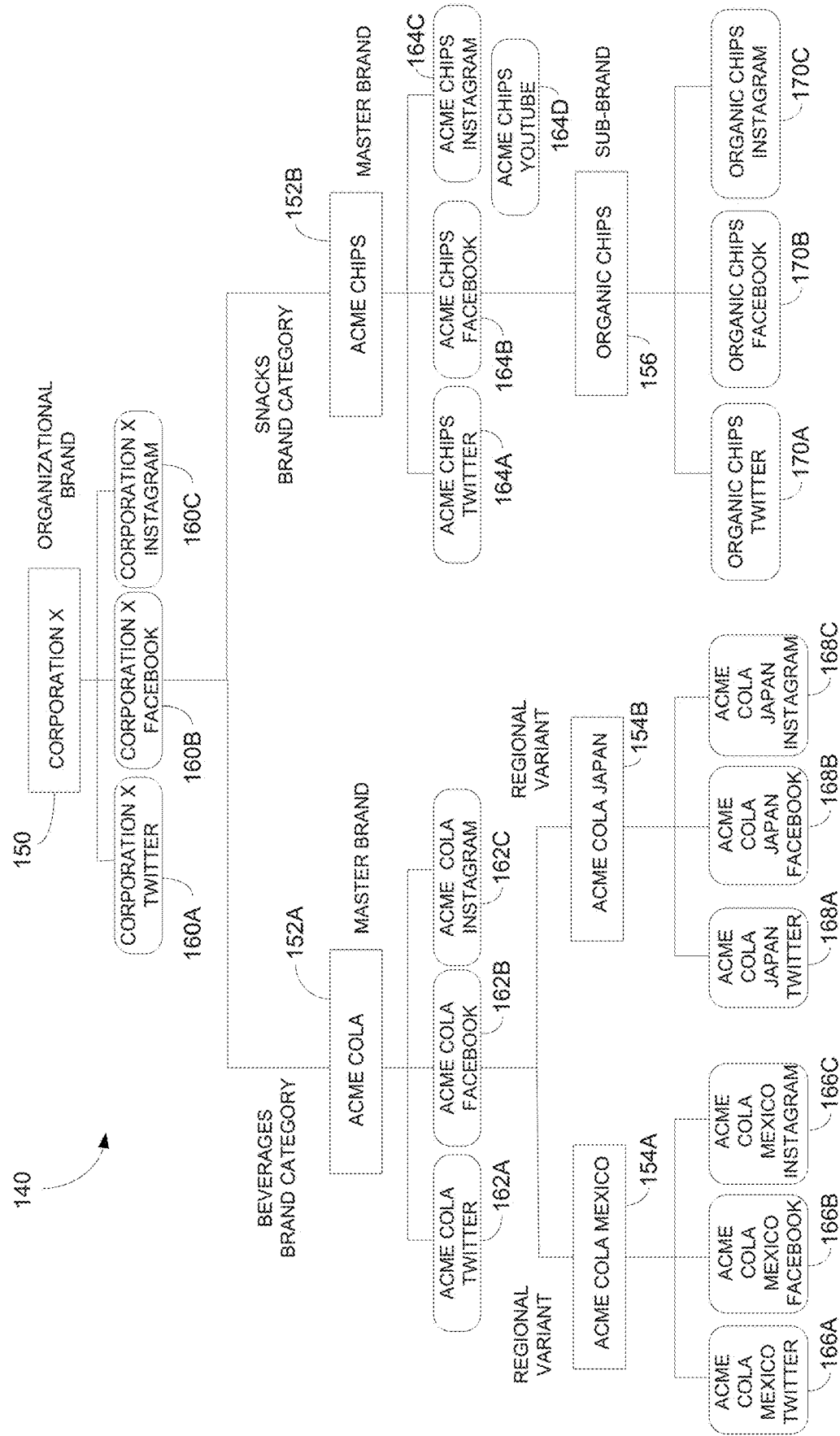
FIG. 1B shows in more detail how the mapping system of FIG. 1A generates an organization map.

FIG. 1B shows in more detail how mapping system 100 identifies different brands associated with a company. Referring to FIGS. 1A and 1B, and as explained above, mapping system 100 may search for websites 104 that include search term 134. In this example, search term 134 is Acme, and mapping system 100 identifies the website www.acme.com. Mapping system 100 may identify other websites that include variations of the Acme search term 134, such as www.acmecola.com and www.acmechips.com. Mapping system 100 also may scan social media network 114 for any social media accounts 115 that include the keyword Acme or variations of the keyword Acme.

Mapping system 100 may scan content on the identified Acme websites for words, patterns, links, directories, and/or any other metadata identifying other social media accounts operated by the Acme Company. For example, mapping system 100 may identify links 110 on the www.acme.com website to Twitter® social media account 160A (www.twitter.com/acme), Facebook® social media account 160B (www.facebook.com/acme), and Instagram® social media account 160C (www.instagram.com/acme).

Either through a direct keyword search or via a scan of the www.acmecola.com website, mapping system 100 may identify links to www.twitter.com/acmecola, www.facebook.com/acmecola, and www.instagram.com/acmecola for social media accounts 162A, 162B, and 162C, respectively. Mapping system 100 may scan the identified www.acmechips.com website and identify links www.twitter.com/acmechips, www.facebook.com/acmechips, www.instagram.com/acmechips, and www.youtube.com/acmechips for social media accounts 164A, 164B, and 164D, respectively.

Mapping system 100 may identify URLs for other websites 104 or social media accounts 115 that include a same Acme keyword but with different country domains. For example, mapping system 100 may identify social media accounts 166A, 166B, and 166C at www.twitter.com/acmecola_mx, www.facebook.com/acmecola_mx, and www.instagram.com/acmecola_mx, respectively. Mapping system 100 also may identify social media accounts 168A, 168B, and 168C at www.twitter.com/acmecola_jp, www.facebook.com/acmecola_jp, and www.instagram.com/acmecola_jp, respectively.

As also explained above, mapping system 100 may use verification badges 116 and website links 118 in social media profiles 120 to confirm social media accounts 160-170 are operated by the same Acme Company. Mapping system 100 then uses the metadata embedded into the public code of discovered websites 104 or social media accounts 160-170 to reverse engineer a current product catalog for the brands operated by the Acme Company.

For example, mapping system 100 may classify the Acme Company referred to in the www.acme.com website and social media accounts 160 as an organizational brand 150. Mapping system 100 may classify Acme Cola associated with the www.acmecola.com website and social media accounts 162 as a master brand 152A underneath organizational brand 150. Mapping system 100 may classify Acme Chips associated with the www.acmechips.com website and social media accounts 164 as another master brand 152B underneath organizational brand 150.

Mapping system 100 may classify all of the Mexican social media accounts 166 as an Acme Cola Mexico regional variant brand 154A and classify all of the Japanese social media accounts 168 as an Acme Cola Japan regional variant brand 154B under Acme Cola master brand 152A.

Mapping system 100 may use identified social media accounts 160-168 to verify the identified Acme brands. For example, an identified Acme brand, such as Acme Chips master brand 152B, is more likely to have associated social media accounts 164.

Mapping system 100 scans the identified websites and social media accounts for any other brands owned by the Acme Company. Search engines require websites 104 to use standard metadata formats to link to products and brands. For example, the www.acme.com website may include a shopping or products section identifying brands sold by the Acme Company. Mapping system 100 searches identified websites 104 for this product metadata to identify any Acme brands. Mapping system 100 also may look for words such as, brand, shop, shop now, products, etc. to help identify and classify brands 150-156.

For example, the www.acme.com and/or www.acmechips.com website may include links to, or refer to, an Organic Chips product. Mapping system 100 may perform an additional keyword search for Organic Chips or use the identified links to identify social media accounts 170A, 170B, and 170C for www.twitter.com/organicchips, www.facebook.com/organicchips, www.instagram.com/organicchips, respectively.

A name such as Organic Chips does not include the keyword Acme and it may be unclear if Organic Chips is a sub-brand 156 of Acme Chips brand 152B or even a brand owned by the Acme Company organizational brand 150. Mapping system 100 may check the profiles of social media accounts 170 for verification badges 116 and any links 118 to master brand 152B or organization brand 150. Mapping system 100 also may search for content on the www.organicchips.com website and social media websites 170 for references to Acme and Acme Chips. Based on the multiple references to Organic Chips on the www.acmechips.com website and social media accounts 164, mapping system 100 may determine Organic Chips is a sub-brand 156 of Acme Chips master brand 152B.

Mapping system 100 may identify brands that might be associated with the Acme Company. However, mapping system 100 may not know how the identified brands are linked to other brands in org chart 140. Mapping system 100 may display brand names in another section of org chart 140 unconnected to other brands. The system operator can then drag and drop the unconnected brands into the correct location within org chart 140. The system operator can also create or change the brand categories for different groups of brands. The operator can also delete any identified brands that are not owned by the Acme Company.

Other brand categories identified by mapping system 100 may include monolithic brands that include the name of company plus a common name, such as Google Maps®. Endorsed brands may include the name of brand strongly associated with a master brand, such as California Adventure® and Disney®. Pluralistic brands are not associated with a master brand 152 but are owned by a same organizational brand 150, such as Pepsico® and Quaker Oats®, or Nike® and Converse®. Regional variant brands 154 are associated with a location of a parent brand 152A, such as Nike Running® Japan. Endorsed brands may be associated with a master brand 152 but may not include the master brand, such as Air Jordan®.

Companies communicate through different levels of social media accounts 115, such as creating campaigns and starting product launches. Therefore, social media accounts 115 are also more likely to be updated in real-time to incorporate the latest campaigns and product launches. Companies also create different social media accounts 115 for different regional variant brands 154. Each of these different brands typically include separate organizations or teams within a corporate structure, such as sales teams and accounting divisions that are often responsible for separate budgets, sales, campaigns, and goal tracking. Mapping system 100 uses these communication characteristics between bands and social media accounts 115 to more accurately create organization chart 140 for a company.

Figure 2:
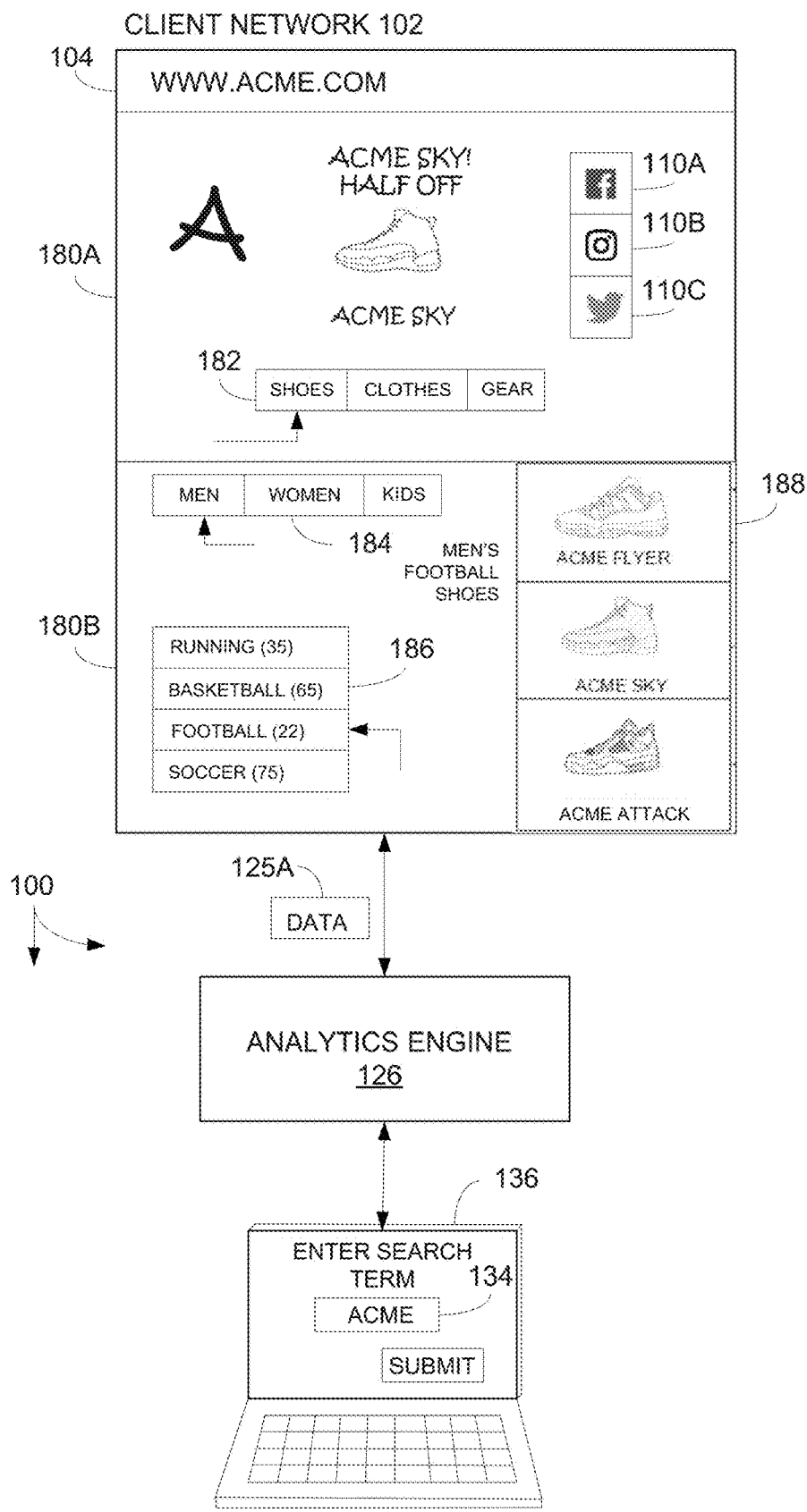
FIG. 2 shows how the mapping system scans a client website.

FIG. 2 shows in more detail how mapping system 100 generates organization map 140 in FIGS. 1A and 1B. In this example, the Acme Company sells athletic wear. Mapping system 100 may search for any URLs that include the Acme search term 134. In this example, mapping system 100 identifies www.acme.com website 104. Mapping system 100 may identify multiple other websites that include the search term Acme. Mapping system 100 may display the identified websites 104, and possibly the home pages of the identified URLs, to the user on computer 136. The system operator may select any of the websites operated by the Acme Company.

Mapping system 100 scans webpages 180 on the selected websites 104 for links to social media accounts also operated by the Acme Company. In this example, mapping system 100 identifies links 110A, 110B, and 110C to Acme social network accounts on Facebook®, Instagram®, and Twitter®, respectively. Scanning social network accounts is described in more detail below.

Mapping system 100 also scans webpages 180 for Acme products. For example, mapping system 100 may look for words, patterns, and/or any other metadata identifying a shopping section on website 104. As mentioned above, search engines may require webpages 180 to use standard metadata formats to link products and brands. Mapping system 100 searches webpages 180 for this product metadata to identify additional Acme brands and products.

The metadata on webpages 180 also may identify hierarchical relationships and categories for the different brands and/or products. For example, webpage 180A may identify different shoe, clothes, and gear brand categories 182. Shoe category 182 may be linked to second webpage 180B that identifies subcategories 184 for men, women, and kid shoes. Men's subcategory 184 may link to yet another sub-category 186 that identifies different types of men's shoes, such as running, basketball, football, and soccer. Webpage 180B may include links to other webpages or icons that identify all of the different brands/products 188 sold under each subcategory 186. For example, football category 186 links to Acme Flyer, Acme Sky, and Acme Attack shoes.

All of the name, hierarchy, and classification details for Acme brands and products is embedded into the metadata public code of webpages 180 to optimize information access by search engines and social networks. Mapping system 100 uses this metadata to reverse engineer current product catalogs of companies.

Mapping system 100 may create objects for identified product categories 182, 184, 186 and products 188. In one example, mapping system 100 may identify Acme Flyer, Acme Sky, and Acme Attack as product objects and identify categories 182, 184, 184 as brand objects having a similar hierarchical relationship as identified in website 104. Mapping system 100 may modify the identified objects and their classification and relationships based on additional data obtained from other websites 104 and social media accounts 115 as described below.

Figure 3:
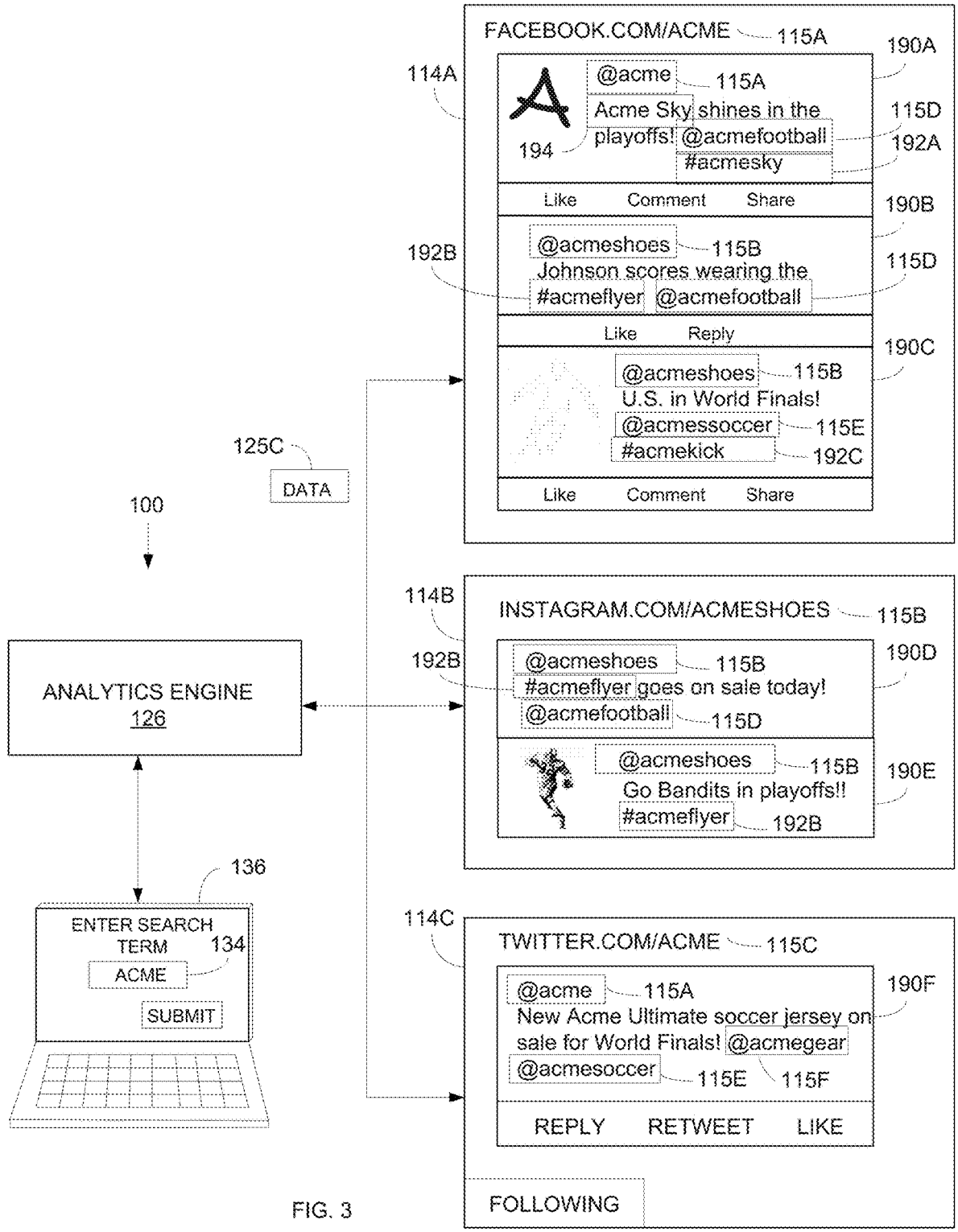
FIG. 3 shows how the mapping system scans social network accounts.

FIG. 3 shows how mapping system 100 further classifies brands based on objects from social media accounts 115. As explained above, mapping system 100 may identify social network accounts 115 from a keyword search or from links 110 identified on Acme websites 104 as shown in FIG. 2. In this example, three different social media accounts 115A, 115B, and 115C are identified on three different social networks 114A, 114B, and 114C, respectively.

For example, Acme account 115A exists on Facebook® social network 114A, Acmeshoes account 115B exists on Instagram® social network 114B, and another Acme account 115C exists on Twitter® social network 114C. Of course, these are just examples of any number of different social network accounts 115 the same Acme Company may operate on any number of different social networks 114.

Mapping system 100 may discover other Acme accounts mentioned, followed, or linked in posted messages 190. In this example, mapping system 100 identifies additional social media accounts 115D for Acmefootball, 115E for Acmesoccer, and 115F for Acmegear. Acme accounts 115A-115E may exist is on each of the different social media networks 114.

Social media accounts 115 and their patterns of posted messages 190 may mirror the organization structure of the underlying company. For example, businesses often post messages 190 that mention the names of their brands and products.

Based on messages 190 posted on social network accounts 115, mapping system 100 may determine Acme account 115A is associated with an organizational brand 150. For example, a large number of the other identified Acme accounts may post on Acme account 115A or include profile links to a www.acme.com website that links to Acme account 115A.

It has also been discovered that companies often use proper nouns or other keywords in posted messages 190 to refer to different campaigns and brands. For example, message 190A may include the Acme Sky keyword 194. Message 190A was posted by Acme account 115A and also mentions Acmefootball account 115D and Acmesky hashtag 192A. Keyword 194 is also the same name used for a shoe 188 identified on Acme website 104 in FIG. 2. Based on all of this information, mapping system 100 may determine Acme Sky is a sub-brand under an Acmefootball brand.

It has also been discovered that social network accounts 115 often follow other social media accounts operated by the same company. Mapping system 100 may discover that Acme account 115A follows Acmeshoes account 115B and Acmegear account 115F. Mapping system 100 also discovers that Acmeshoes account 115B follows Acmefootball account 115D and Acmesoccer account 115E.

Accordingly, mapping system 100 identifies Acmeshoes and Acmegear as master brands under the Acme organization brand associated with Acme account 115A. Mapping system 100 also may identify Acmefootball and Acmesoccer as sub-brands under the Acmeshoes master brand.

To further confirm these brand classifications, mapping system 100 previously identified Acme shoes and Acme gear as top level brands on the Acme.com website 104 in FIG. 2. Mapping system 100 also previously identified Acme football and Acme soccer as sub-brands of the Acme shoe brand on the Acme.com website 104 in FIG. 2. Mapping system 100 also may identify a large number of mentions or likes by Acme Shoes account 115B on Acmefootball account 115D and Acmesoccer account 115E.

Mapping system 100 also may identify campaigns in posted messages 190, when the campaigns started, how long the campaigns have been running and regions where the campaigns are taking place. Hashtags 192 mentioned multiple times, typically two or more times, by the same social media account 115 strongly indicates a campaign initiated by the particular brand associated with that social media account 115.

Mapping system 100 identifies hashtags 192A, 192B and 192C mentioned by Acme accounts 115A, 115B and 115C. Mapping system 100 identifies hashtags 192 mentioned more than some threshold number of times by a particular Acme account 115 as a campaign associated with that account 115. For example, Acmeshoes account 115B mentions Acmeflyer hashtag 192B in messages 190B, 190D, and 190E. Mapping system 100 may determine the Acmeflyer is a campaign run by the Acmeshoes brand.

The type of campaigns discovered on social media accounts 115 can often be determined by key phrases or which other included elements. For instance, if the posted message on the social media account may talk about the launch of something or introducing something, that can be categorized as a product campaign. If the posted message uses the phrase, "read this" or "great article", the campaign can be an editorial campaign.

U.S. patent application Ser. No. 15/246,061, filed Aug. 24, 2016, entitled: DYNAMIC CAMPAIGN ANALYTICS VIA HASHTAG DETECTION describes in more detail different ways of detecting campaigns associated with different social media accounts and is herein incorporated by reference in its entirety.

Social media accounts 115 also may mention different events, such as a football camp or a fun run. An Acme brand may sponsor the event or the Acme brand may have some other interest in the event. Mapping system 100 search messages 190 for any other proper names, keywords, accounts, or hashtags mentioned multiple times by the same social media account 115. Hashtags or proper names including the keyword Acme, or determined to be affiliated with Acme, may be identified as campaigns. Hashtags or proper names that do not include the Acme name and are not affiliated with Acme may be identified as events. Of course, mapping system 100 may use other criteria or relationships for identifying campaigns and events.

Certain social media channels like Facebook® have places on brand pages to list upcoming events. This list of events can also be used to generate an event list that can populate the enterprise software as important events. Any post in other social media channels that include date and time elements can also be scanned and used to populate an event calendar. Mapping system 100 looks for any other patterns in messages 190 that identify relationships between brands, products, campaigns and events.

As explained above, regional variants are also often created by regional offices to communicate to consumers in a particular region or language. For example, an Acme Twitter account might also have Acme Japan, Acme France, and Acme New York, accounts. These specific regions are identified by mapping system 100 as Japan, France, and New York regional variant brands and represent significant and meaningful regions and DMAs to the parent Acme Company with teams and sales activity aligned to those regions.

Employees of a brand, including executives like CEO, CMO, CTO, often indicate their title as well as the brand they work for in the social media profiles. This is discoverable by mapping system 100 and these key employees can be mapped the company or the appropriate brand.

Figure 4:
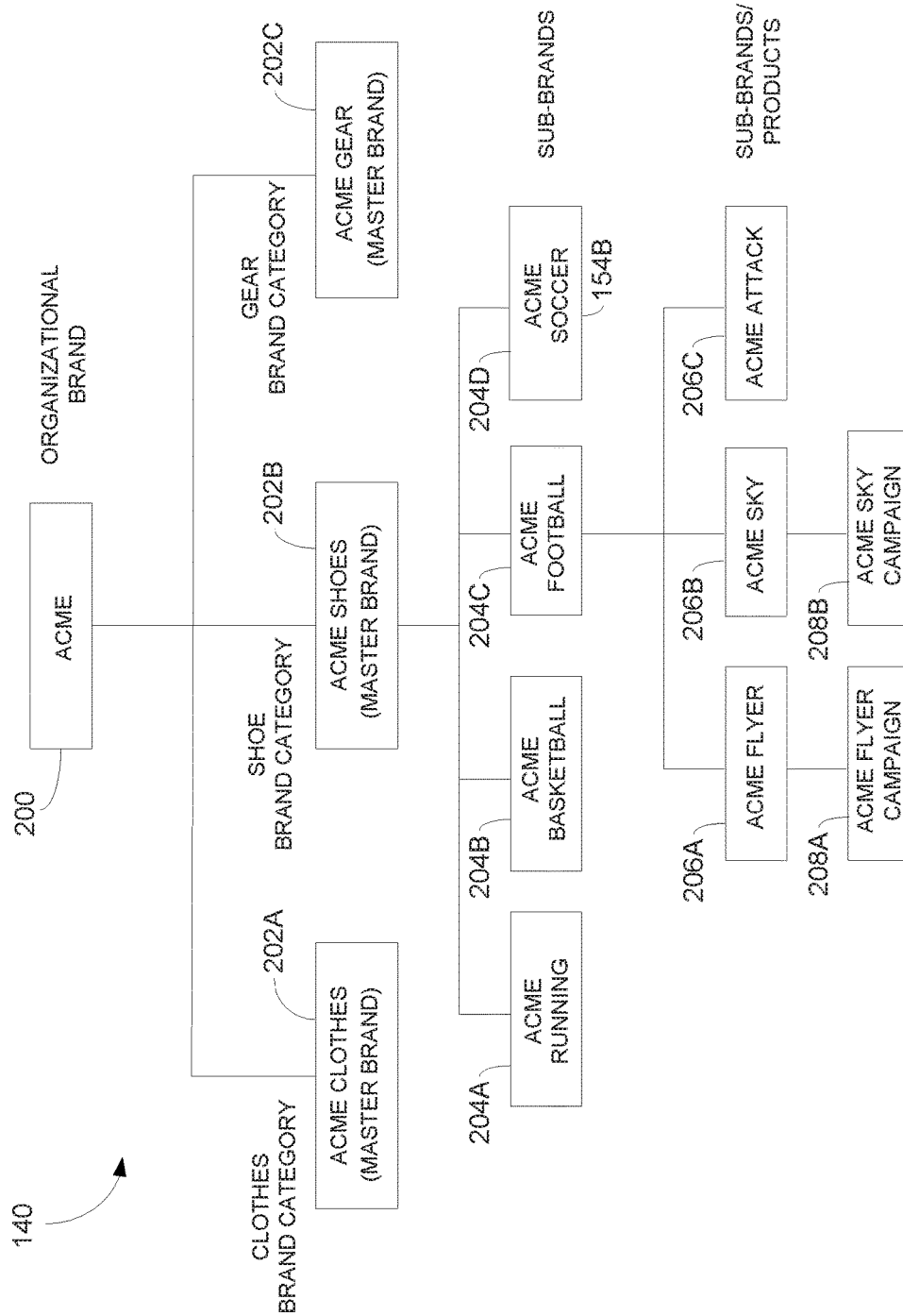
FIG. 4 shows another organization map generated by the mapping system.

FIG. 4 shows a portion of an organization map 140 automatically generated by mapping system 100 based on the websites 104 and social media accounts 115 in FIG. 2 and FIG. 3. To review, mapping system 100 scanned website 104 to identify identified brands and brand categories sold by Acme. Mapping system 100 also identified patterns of how different Acme social media accounts 115 followed and mentioned other Acme accounts in links, hashtags, and keywords.

From this scanned online data, mapping system 100 identified the Acme Company as an organizational brand 200, and identified Acme clothes, Acme shoes, and Acme gear as master brands 202A, 202B, and 202C, respectively. Mapping system 100 also identified Acme running, Acme basketball, Acme football, and Acme Soccer as sub-brands 204A, 204B, 204C, and 204D, respectively, of Acme shoes master brand 202B.

Mapping system 100 identified Acme Flyer, Acme Sky, and Acme Attack as sub-brands 206A, 206B, and 206C, respectively, of Acme football brand 104C. Mapping system 100 then identified a first campaign 208A run by Acme flyer brand 206A and a second campaign 206B run by the Acme sky brand 206B.

As also mentioned above, brands 200-206 may have associated regional variant brands. For example, websites 104, social media accounts 115, hashtags 192, and/or keywords 194 may include geographic data. For example, mapping system 100 may identify different hashtags #acmeskyla and #acmeskyny posted several times by Acmefootball account 115D. Mapping system 100 may create separate campaigns 208B under Acme Sky brand 206B for the Los Angeles and New York regions.

In another example, mapping system 100 may access Google Maps®, Yelp®, or other business locator software, to identify locations for particular brands or stores. Mapping system 100 then adds the location classification to the associate brand, product, or campaign.

Figure 5:
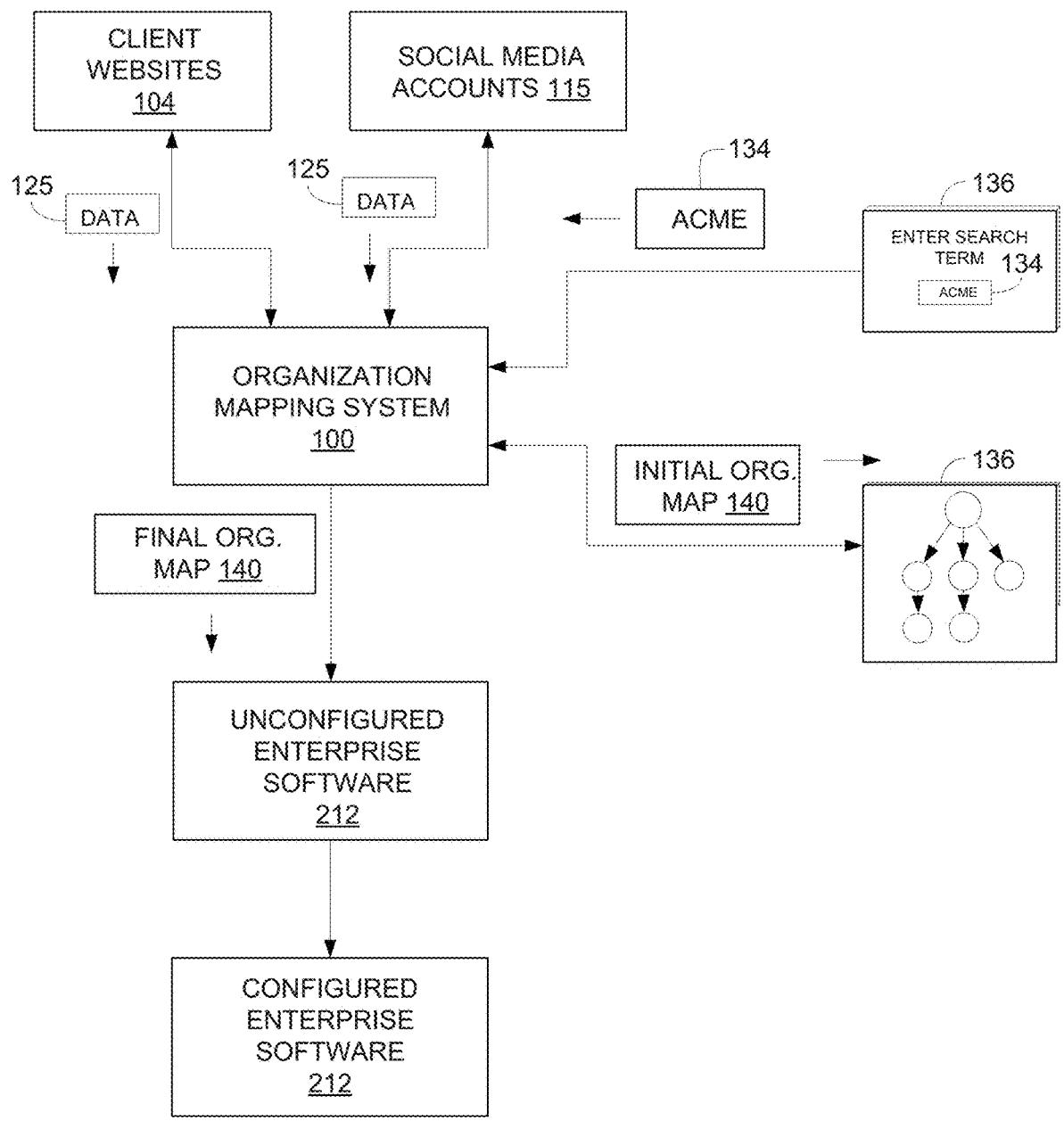
FIGS. 5 and 6 show how the mapping system configures enterprise software.
Figure 6:
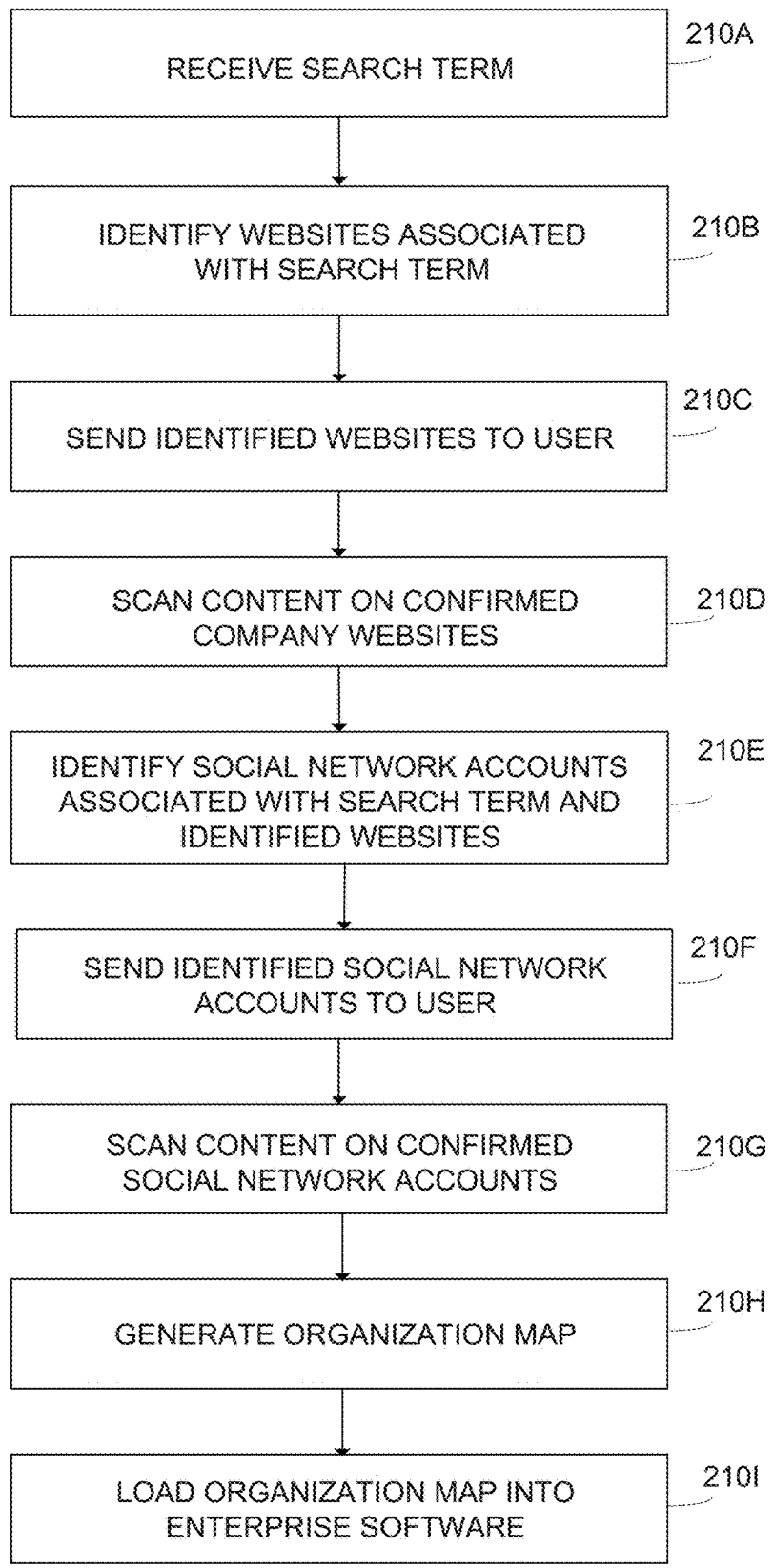

FIGS. 5 and 6 further describe the process used by mapping system 100 to generate org map 140. In operation 210A, mapping system 100 receives a search term 134 entered into computer 136 by a user. In operation 210B, mapping system 100 searches URLs for client websites 104 matching search term 134. In operation 210C, mapping system 100 may display any identified websites 104 to the user via computer 136. In operation 210D, mapping system 100 scans webpages on the websites 104 confirmed by the user.

In operation 210E, mapping system 100 identifies social media accounts 115 associated with search term 134. As mentioned above, mapping system 100 may identify links on websites 104 to social network accounts 115 associated with the same company and may search for social media accounts 115 with URLs that include different forms of search term 134. Mapping system 100 may scan identified social media accounts 115 for any other social media accounts 115 associated with the company.

In operation 210F, mapping system 100 may display the discovered social media accounts 115 to the user via computer 136. The user may select any of the identified social media accounts 115 associated with the company. In operation 210G, mapping system 100 scans messages posted by the selected social network accounts 115 as described above.

In operation 210H, mapping system 100 generates organization map 140 as described above based on identified client websites 104, social media accounts 115, and the other data 125 scanned from those websites and social media accounts. For example, mapping system 100 generates org map 140 based on the websites 104 and social media accounts 115 associated with the company, the products identified on client websites 104 and social media accounts 115, which products include associated client websites 104 and social media accounts 115, and which social media accounts 115 follow, like, and/or mention other social media accounts 115, brands, products, campaigns, or events associated with the same company.

Mapping system 100 may display, and allow a user to modify, initially generated org map 140 on computer 136. Mapping system 100 loads the final edited org map 140 into un-configured enterprise software 212. Enterprise software 212 may generate folders, accounts, directories, tables, fields, cases, records, files, or any other object or date structure for each object in org map 140. Enterprise software 212 also links the objects together in a hierarchical structure as shown in org map 140.

Enterprise software 212 may include any software application that can be configured according to a company organization structure, such as email software, marketing software, advertising software, accounting software, login software, document management software, customer relationship management (CRM) software, network software, social media software, information technology (IT) software, or any other database software.

Mapping system 100 also may automatically update enterprise software 212 in real-time whenever the company creates a new brand, sells a new product, runs a new campaign, or starts promoting a new event. Mapping system 100 detects and generates objects for the new brand, product, campaign, or event identified on new or existing company websites 104 and/or company social network accounts 115. Mapping system 100 updates org map 140 with the new objects and then sends the updated org map 140 to enterprise software 212 to automatically generate associated objects such as folders, directories, accounts, tables, fields, cases, records, and/or files associated with the new brand objects. Enterprise software 212 locates the new objects in positions relative to other objects in org map 140.

Figure 7:
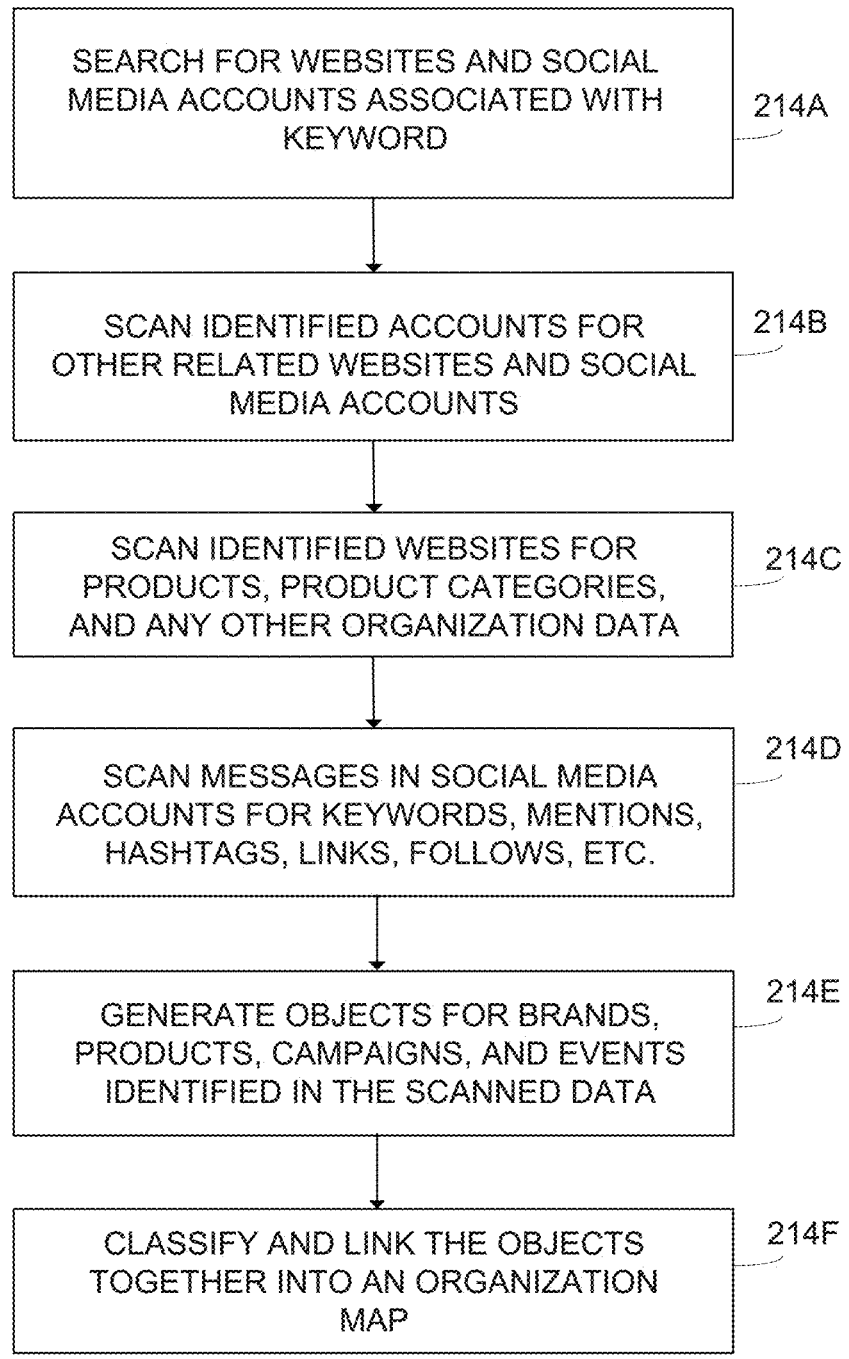
FIG. 7 shows how the mapping system generates an organization map.

FIG. 7 shows in more detail the process used by mapping system 100 for generating organization map 140. In operation 214A, mapping system 100 receives a keyword and searches for websites or social media accounts that may include entered keyword. For example, the keyword may comprise the name of a company, brand, or product. Mapping system 100 may search for any domain names or social media accounts that include the keyword.

In operation 214B, mapping system 100 scans the identified websites and social media accounts for any other websites or social media accounts that may be associated with the company, brand, or product. For example, mapping system 100 may identify links to related Acme websites and/or social media accounts. Mapping system 100 also may identify other Acme sub-accounts followed, liked, or mentioned by the primary accounts. For example, Acme twitter account www.twitter.com/acme may follow Acme twitter accounts www.twitter.com/acmeshoes and www.twitter.com/acmefootball.

In operation 214C, mapping system 100 scans the identified websites for products, product categories, and any other metadata that may provide insight into the brand organization of the company. As mentioned before, websites may include lists, directories, or other metadata identifying different company brands and a hierarchical relationship between at last some of the brands.

In operation 214D, mapping system 100 scans the social media accounts for any other keywords, mentions, hashtags, links, etc. that may be associated with the company brands. As mentioned above, a social media account mentioned or liked by another social media account may indicate a brand relationship between the two social media accounts. As also mentioned above, social media accounts also may include profiles that link to websites for related brands.

In operation 214E, mapping system 100 generates objects identifying the different brands, brand categories, products, campaigns or any other entity that may be operating within the company. Mapping system 100 may classify objects as different brands, brand categories, campaigns, products, and/or events based on the metadata identified on websites 104. Mapping system 100 also may classify objects based on how associated accounts, keywords, and hashtags are used in posted social media messages.

In operation 214F, mapping system 100 links the identified objects together into an organization map 140 based on patterns of use of the websites and social media accounts. As mentioned above, a social network account that follows a large number of other accounts for the same company may be identified as the organizational brand of the company. Another social media account for the same company that repeatedly mentions a particular group of items such as accounts, keywords, or hashtags may be identified as a master brand of the mentioned items. The group of accounts, keywords, and/or hashtags repeatedly mentioned by the master brand account may be identified as sub-brands, products, or campaigns of the master brand.

For example, a first Acme account may follow, mention, like, or link to a large number of other Acme accounts, keywords, and hashtags. Mapping system 100 may classify the first Acme account as the organizational brand for the Acme Company.

A second Acme account may follow mention, like, or link to a second more specific group of Acme accounts, keywords, and hashtags. Mapping system 100 may classify the second Acme account as a master brand of the Acme Company and link the master brand underneath the organizational brand.

A third Acme account in the second group of Acme accounts may follow mention, like, or link to a third smaller group of Acme accounts, keywords, and hashtags. Mapping system 100 may classify the third Acme account as a sub-brand of the master brand and link the sub-brand underneath the master brand.

Mapping system 100 may classify any hashtags or keywords mentioned in the third Acme account a threshold number of times as a campaign or event and link the campaign or event underneath the sub-brand.

Figure 8:
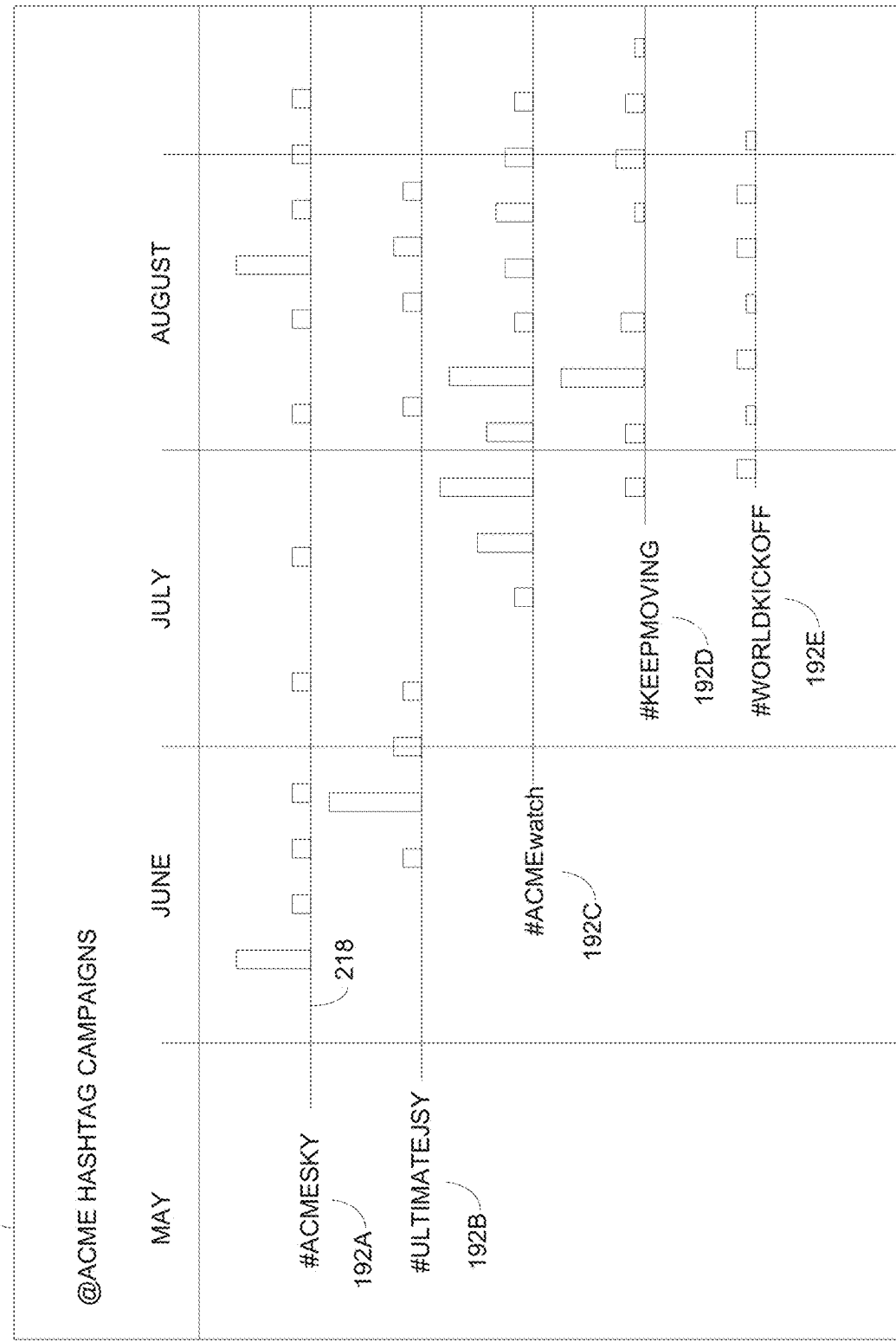
FIG. 8 shows a campaign chart generated by the mapping system.

FIG. 8 shows how mapping system 100 displays a campaign graph 216 for different campaigns run underneath the Acme brand. For example, mapping system 100 identifies all brands and products operating underneath the Acme organizational brand as described above. Mapping system 100 then identifies all of the hashtags 192 used by those brands and determines which hashtags 192A-192E are associated with Acme campaigns. Mapping system 100 displays timelines 218 that identify when the hashtag campaigns started and the number of times the hashtags 192 are used in company messages over time. Mapping system 100 also may generate hashtag campaign graphs 216 for specific Acme brands or products, such as for @acmemensshoes, @acmefootball, @acmeflyer, @acmeattack, etc.

Campaign graph 216 provides an up to the minute indication of all campaigns run by a same company. The company then has a better idea of how to organize campaigns based on the trail of social media hashtags used by the company accounts.

Campaign graphs 216 can also track campaigns run by business partners. For example, a retailer may launch a social media campaign for a particular Acme product. Mapping system 100 generates a campaign graph 216 that identifies the number of messages posted by the retailer's social network account.

Mapping system 100 can also discover how competitors are organized and the success of competitor campaigns. Mapping system 100 can also detect who else is mentioning Acme brands and products and identify those users as partners or influencers. For example, mapping system 100 can search all social network accounts posting messages that include the #acmesky hashtag. Mapping system 100 then identifies the accounts posting the messages as partners or influencers.

Hardware and Software

Figure 9:
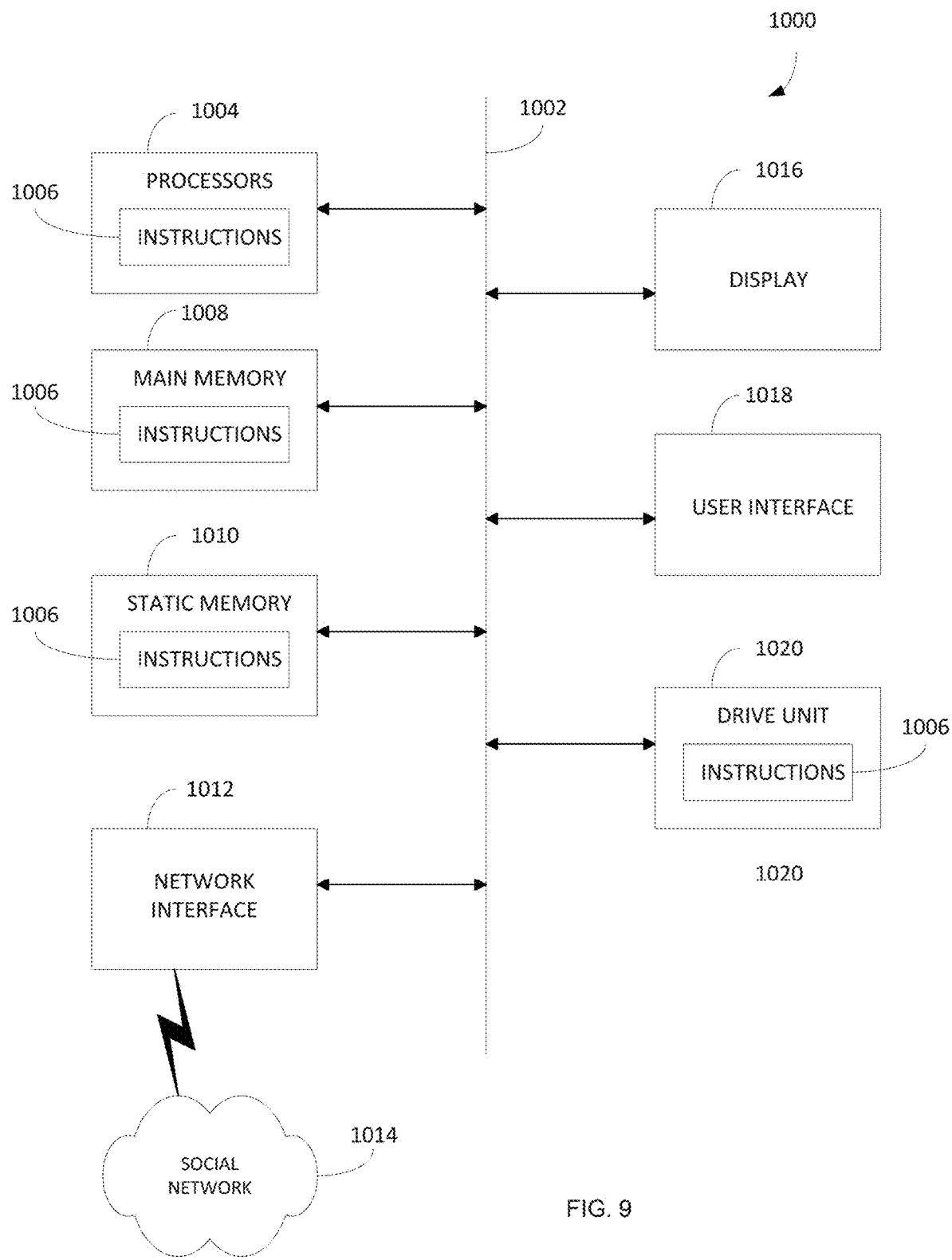
FIG. 9 shows a computing device used in the mapping system.

FIG. 9 shows a computing device 1000 that may be used for operating the mapping system 100 and performing any combination of processes discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. An organization mapping system, comprising:
a processor; and
one or more stored sequences of instructions stored on a non-transitory computer-readable media which, when executed by the processor, cause the processor to carry out the steps of:
receiving a search term from a user computer;
searching for the one or more websites associated with the search term;
scanning content on the one or more websites for objects representing an organization structure of an entity operating the one or more websites;
searching for one or more social network accounts associated with the search term;

scanning content from the one or more social network accounts for objects representing the organization structure of the entity, wherein the entity operates the social network accounts;

wherein at least one of the scanning the content on the one or more websites and the scanning the content from the one or more social network accounts is completed based on discovered information from previous website or social media scans;

generating an organization map that includes the objects scanned from the one or more websites with the objects scanned from the one or more social network accounts; and using the organization map to configure the organization structure into enterprise software.

2. The organization mapping system according to claim 1, wherein the instructions further cause the processor to carry out the steps of:

identifying products and product categories on the one or more websites;

identifying at least some of the products as brands in the organization map; and linking the brands in the organization map based on how the products are linked to the product categories on the one or more websites.

3. The organization mapping system according to claim 1, wherein the instructions further cause the processor to carry out the steps of:

scanning messages posted by the one or more social network accounts for mentions of any additional social network accounts operated by the entity; and generating objects for the additional social network account(s) based on the number of times the additional social network account(s) are mentioned in the posted messages.

4. The organization mapping system according to claim 1, wherein the instructions further cause the processor to carry out the steps of:

identifying any additional social network accounts followed by the one or more social network accounts; and generate objects for at least one of the additional social network account(s).

5. The organization mapping system according to claim 1, wherein the instructions further cause the processor to carry out the steps of:

scanning messages posted by the one or more social network accounts for keywords; and generating objects for the keyword based on the number of times the keywords are used in the posted messages.

6. The organization mapping system according to claim 1, wherein the instructions further cause the processor to carry out the steps of:

scanning messages posted by the one or more social network accounts for hashtags; and generating objects for the hashtags based on the number of times the hashtags are used in the posted messages.

7. The organization mapping system according to claim 6, wherein the instructions further cause the processor to carry out the steps of:

identifying objects for at least one of the one or more social network accounts posting the messages including the hashtags as brand objects:

identifying objects for at least some of the hashtags as campaign objects; and linking the campaign objects to the brand objects in the organization map.

8. The organization mapping systems according to claim 6, wherein the instructions further cause the processor to carry out the steps of:

identifying names of the hashtags that match names of products identified on the one or more websites; and identifying the hashtags as campaign objects in the organization map and naming the products as product objects in the organization map.

9. The organization mapping system according to claim 1, wherein the instructions further cause the processor to carry out the steps of:

identifying locations referenced in the content from the one or more social network accounts; and identifying the locations in at least some of the objects.

10. An organization mapping system, comprising:

a processor; and one or more stored sequences of instructions stored on a non-transitory computer-readable media which, when executed by the processor, cause the processor to carry out the steps of:

receiving a search term from a user computer;

searching for one or more websites associated with the search term;

scanning content on the one or more websites for objects representing an organization structure of an entity operating the one or more websites;

searching for one or more social nets network accounts associated with the search term;

scanning content from the one or more social network accounts for objects representing the organization structure of the entity, wherein the entity operates the social network accounts;

scanning the one or more websites for links identifying at least one of the one or more social network accounts;

scanning the content from the at least one identified social network account for the objects representing the organization structure of the entity;

generating an organization map that includes the objects scanned from the one or more websites with the objects scanned from the one or more social network accounts; and using the organization map to configure the organization structure into enterprise software.

11. A computer program for identifying an organization structure of a company, the computer program comprising a set of instructions operable to:

receive a search term from a computing device, the search term associated with a name of the company;

search social network accounts associated with the search term;

automatically identify objects in the social network accounts associated with entities operating within the company;

automatically identify patterns of how the objects are used in messages posted by the social network accounts;

automatically classify the objects and identify relationships between the objects based on the patterns in the messages posted by the social network accounts; and generate an organization map from the automatically classified objects and the relationships between the automatically classified objects that represent an organization structure of the entities operating within the company; and using the organization map to configure the organization structure into enterprise software.

12. The computer program of claim 11, further comprising instructions operable to:

search for candidate websites associated with the search term;

display the candidate websites on a user interface;

detect one or more websites selected from the user interface;

identify objects from the one or more selected websites; and combine the objects identified from the one or more selected websites with the objects identified from the social network accounts in the organization map.

13. The computer program of claim 12, further comprising instructions operable to:

search the one or more selected websites for links identifying social network accounts; and identify some of the objects from the identified social network accounts.

14. The computer program of claim 13, further comprising instructions operable to automatically classify the objects based on a comparison of the objects from the one or more selected websites with the objects from the identified social network accounts.

15. The computer program of claim 11, further comprising instructions operable to automatically classify the objects based on how the objects are mentioned in the messages; used as links in the messages, used as hashtags in the messages, used as keywords in the messages, and followed by the social network accounts.

16. The computer program of claim 11, further comprising instructions operable to automatically classify the objects as brands, products, and campaigns based on how the objects are used in the messages posted by the social network accounts.

17. The computer program of claim 11, further comprising instructions operable to automatically classify the objects based on which of the social network accounts operated by the company are followed other social network accounts operated by the company.

18. The computer program of claim 11, further comprising instructions operable to:

identifying a first pattern of the messages mentioning other accounts operated by the company;

identifying a second pattern of the messages mentioning a same hashtag;

identifying a third pattern of the messages mentioning a same keyword associated with the company; and automatically classifying the objects based on the first, second, and third pattern of the messages.

19. The computer program of claim 11, further comprising instructions operable to:

identifying a first pattern of the messages where a first one of the social network accounts follows multiple other accounts operated by the company;

identifying a first one of the objects for the first one of the social network accounts as a parent company;

identifying a second pattern of the messages where a second one of the social network accounts posts messages mentioning a product sold by the company;

identifying a second one of the objects for the second one of the social network accounts as a brand of the company;

locating the second one of the objects underneath the first one of the objects in the organization map;

identifying a third one of the objects for the product mentioned by the second one of the social network accounts as a product of the brand; and locating the third one of the objects underneath the second one of the objects in the organization map.

20. The computer program of claim 19, further comprising instructions operable to:

identifying one of the social network accounts that posts multiple messages that include a same hashtag;

identifying a fourth one the objects for the hashtag as a campaign run by the company; and locating the fourth one of the objects underneath an object one of the social network accounts that posted the multiple messages that included the hashtag.

\* \* \* \* \*